US008357256B2

(12) United States Patent
Dumas et al.

(10) Patent No.: US 8,357,256 B2
(45) Date of Patent: Jan. 22, 2013

(54) PROCESS FOR THE MANUFACTURE OF A THREE-DIMENSIONAL NONWOVEN, MANUFACTURING LINE FOR IMPLEMENTING THIS PROCESS AND RESULTING THREE-DIMENSIONAL, NONWOVEN PRODUCT

(75) Inventors: Jean-Louis Dumas, Guebwiller (FR); Jean Baptiste Schaffhauser, Lautenbach (FR)

(73) Assignee: N. Schlumberger, Guebwiller (FR)

( * ) Notice: Subject to any disclaimer, the term of this patent is extended or adjusted under 35 U.S.C. 154(b) by 572 days.

(21) Appl. No.: 12/226,717

(22) PCT Filed: Apr. 24, 2007

(86) PCT No.: PCT/FR2007/051166
§ 371 (c)(1),
(2), (4) Date: Jan. 23, 2009

(87) PCT Pub. No.: WO2007/125248
PCT Pub. Date: Nov. 8, 2007

(65) Prior Publication Data
US 2010/0064491 A1  Mar. 18, 2010

(30) Foreign Application Priority Data
Apr. 26, 2006  (FR) ...................................... 06 51483

(51) Int. Cl.
*B29C 53/28* (2006.01)
*D06J 1/04* (2006.01)
(52) U.S. Cl. ........................................ 156/205; 156/208

(58) Field of Classification Search .................. 156/205, 156/208, 459, 470; 264/286; 425/369
See application file for complete search history.

(56) References Cited

U.S. PATENT DOCUMENTS

| 2,583,337 | A | * | 1/1952 | Laing | 156/435 |
| 3,157,551 | A | * | 11/1964 | Granozio | 156/471 |
| 3,905,857 | A | * | 9/1975 | Short | 156/435 |
| 4,874,457 | A | * | 10/1989 | Swieringa | 156/474 |
| 5,503,547 | A | * | 4/1996 | Funahashi et al. | 425/336 |
| 6,230,776 | B1 | * | 5/2001 | Choi | 156/441 |

OTHER PUBLICATIONS

Written Opinion of the International Searching Authority from corresponding International Application PCT/FR2007/051166. Date Unknown.*

* cited by examiner

*Primary Examiner* — Michael Tolin
(74) *Attorney, Agent, or Firm* — The Watson I.P. Group, PLC; Jovan N. Jovanovic; Vladan N. Vasiljevic (57) ABSTRACT

The present invention relates to a process for the manufacture of a three-dimensional nonwoven, a manufacturing line for implementing this process and the resulting three-dimensional nonwoven product. Process characterized in that it consists in using a folding element (5) to apply, to an incoming web containing a proportion of thermoplastic fibers and/or filaments or fixing material, an initial fixing of the fold of the incoming web in the form of peaks and troughs, brought about by blades extending radially on ends of the folding element (5), this initial fixing being applied either by maintaining the folding element (5) itself at a set temperature, or by heating the incoming web. The invention is more particularly applicable to the textile industry, especially the manufacture of nonwovens.

12 Claims, 8 Drawing Sheets

PROCESS FOR THE MANUFACTURE OF A THREE-DIMENSIONAL NONWOVEN, MANUFACTURING LINE FOR IMPLEMENTING THIS PROCESS AND RESULTING THREE-DIMENSIONAL, NONWOVEN PRODUCT

The present invention relates to the field of textile industry, particularly to the manufacture of nonwovens, and to a novel process for the manufacture of three-dimensional nonwovens.

The invention also relates to a manufacturing line for the implementation of this process, as well as to the product obtained by this implementation.

Three-dimensional nonwovens differ from flat nonwovens in their large thickness.

Processes for manufacturing said three-dimensional nonwovens, of which some involve direct-path technologies of the type known under the names of spun bound or melt blown, which are known notably from the documents: WO-A-05064060, W-A-O02549581, U.S. Pat. No. 6,582,424, WO-A-04046443, WO-A-04072347, DE-A-10311439 and FR-A-2862986.

The advantage of orienting the fibers vertically in a nonwoven web resides in the fact that such an orientation allows notably, in a known way, the obtention of a low density and of a high resilience, of a resistance to crushing that is maintained over time, and ease of recycling.

These three-dimensional nonwovens are used in thermal and/or acoustic insulation, the replacement of polyurethane foams, internal linings of motor vehicles, seats or cars, the interior lining of shoes, filters, carpet bases, packaging materials, stuffing for comforters or pillows, carpets made of pile or boucle, and reinforcements for composites.

Today, there are essentially three known categories of folding procedures, namely:
 by using machines that make it possible to produce longitudinal or transverse folds, by means of two cardboard pieces between which a fabric is placed (FR-A-1595185) or by means of flat or cylindrical molds (FR-A-1463640),
 by using machines that make it possible to produce longitudinal folds by means of springs and a band (FR-A-2715947) or by means of push bars (FR-A-2398825), or by means of intersecting disks (WO-A-9215315),
 by using machines that make it possible to produce transverse folds, by cuttling (FR-A-1514716), by means of a folding and retention roller (FR-A-1511985), by blowing, by blades with rectilinear displacements (EP-A-350627) or by blades with circular displacement (EP-A-516964).

Today, the vertical orientation of the fibers is carried out by different processes, namely by a pile needle punching process according to a process known by the name of A50V from the company ASSELIN, by means of tufting machines known under the names of COBBLE and MODRA, by procedure known under the name Web Linker from the company LAROCHE, by the so-called STRUTO blade and circular ROTIS process from the company STRUTO, by a process called WAVEMAKER from the company SANTEX, by the Kunit, Multiknit, Malivlies and Maliwatt processes from the company KARL MAYER MALIMO, by the RASCHEL process from the company KARL MAYER, by the process known as run-resistant DG from the company LIBA, or by the BEMAFORMER process from the company BEMATIC.

However, these known manufacturing techniques do not allow the production of three-dimensional nonwovens whose structure presents a perfect vertical orientation, although such an orientation is desired, in order to confer the best resilience to the three-dimensional nonwoven with minimal density.

The purpose of the present invention is to remedy these disadvantages by proposing a novel process for the manufacture of three-dimensional nonwovens as well as a manufacturing line for the implementation of this process.

To this effect, the process for the manufacture of three-dimensional nonwovens is characterized in that it consists in producing, by means of a folding element that works in cooperation with an extraction device consisting of a pair of two muffs (also referred to herein as conveyors), whose linear displacement speed is slightly greater than the outlet speed of the folding element, from an entering web comprising a portion of thermoplastic fibers or fixation material, a prior fixation of the fold of the entering web, in the form of peaks and valleys, which fold is obtained by blades that extend radially on the heads of the folding element, where this prior fixation is carried out either by maintaining the temperature of the folding element itself or by heating the entering web.

The invention also relates to a manufacturing line for the implementation of this process, which is characterized in that it comprises a folding element comprising at least two heads, drums or axles equipped with fixed or orientable radial blades, which intersect, and an extraction device which consists of a pair of two muffs, whose linear displacement speed is slightly greater than the outlet speed of the folding element, as well as the product obtained by the implementation of this process.

The invention will be understood better with the help of the following description, which relates to preferred embodiments that are given as nonlimiting examples, and explained in reference to the schematic drawings in the appendix, in which.

Figure 1:
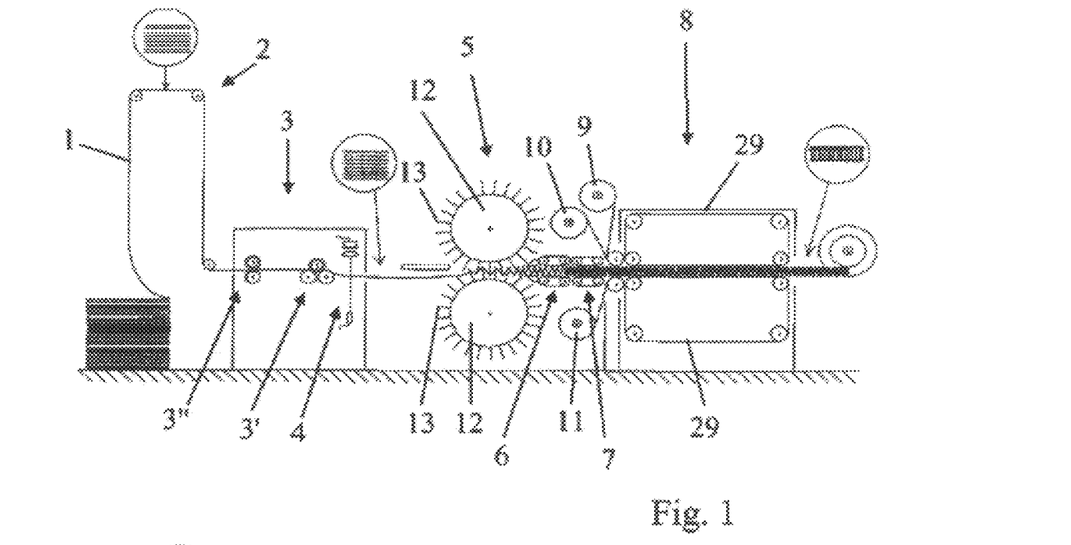
FIGS. 1 and 2 are lateral elevation and cross-sectional views of a manufacturing line that implements the process according to the invention by means of a machine according to the invention.
Figure 2:
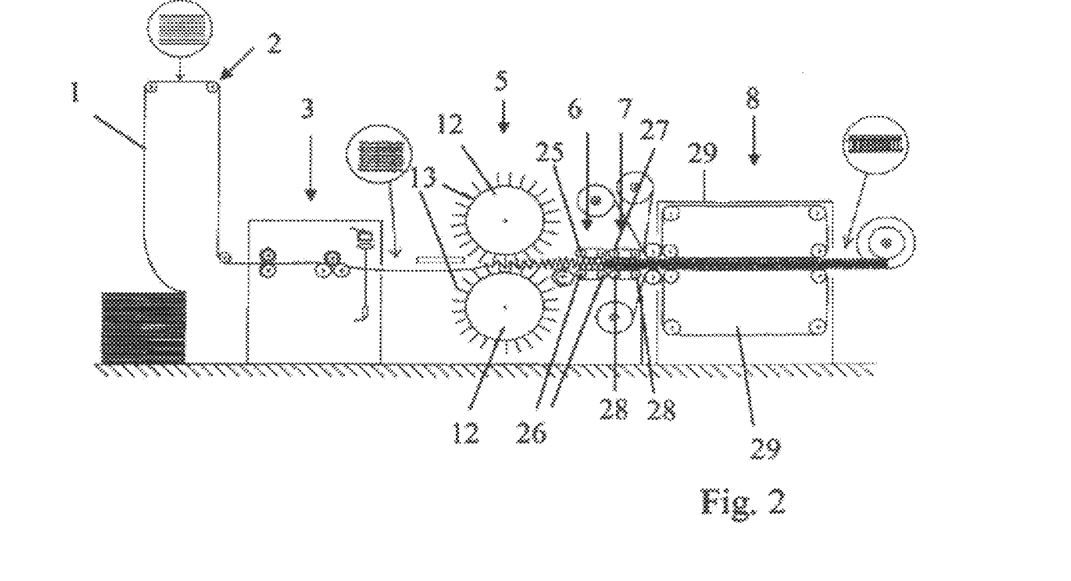
Figure 3:
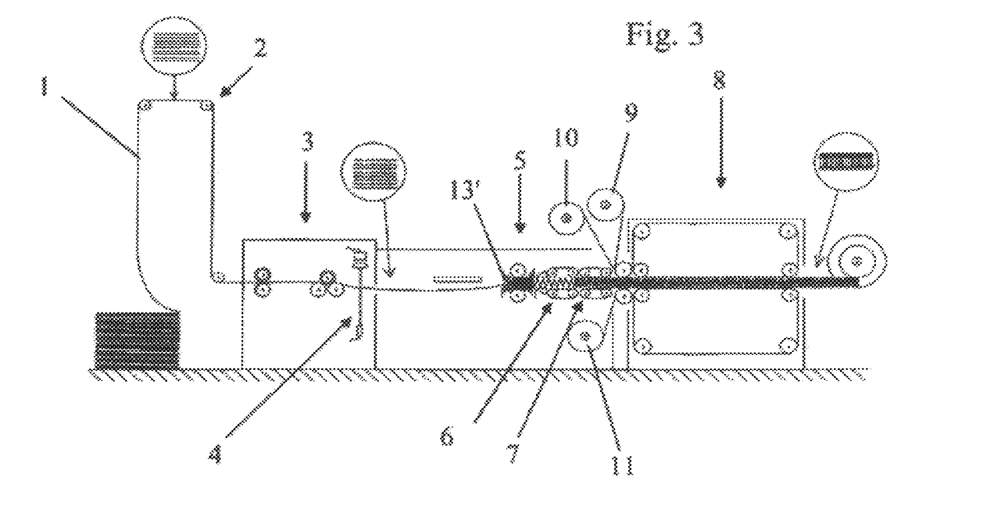
FIGS. 3-7 are views similar to those of FIGS. 1 and 2 of embodiment variants of the machine according to the invention.
Figure 4:
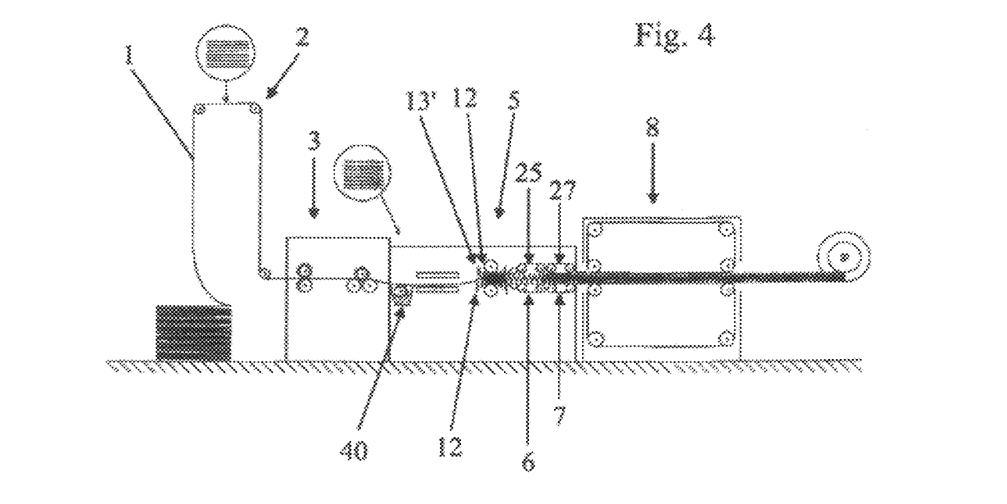
Figure 5:
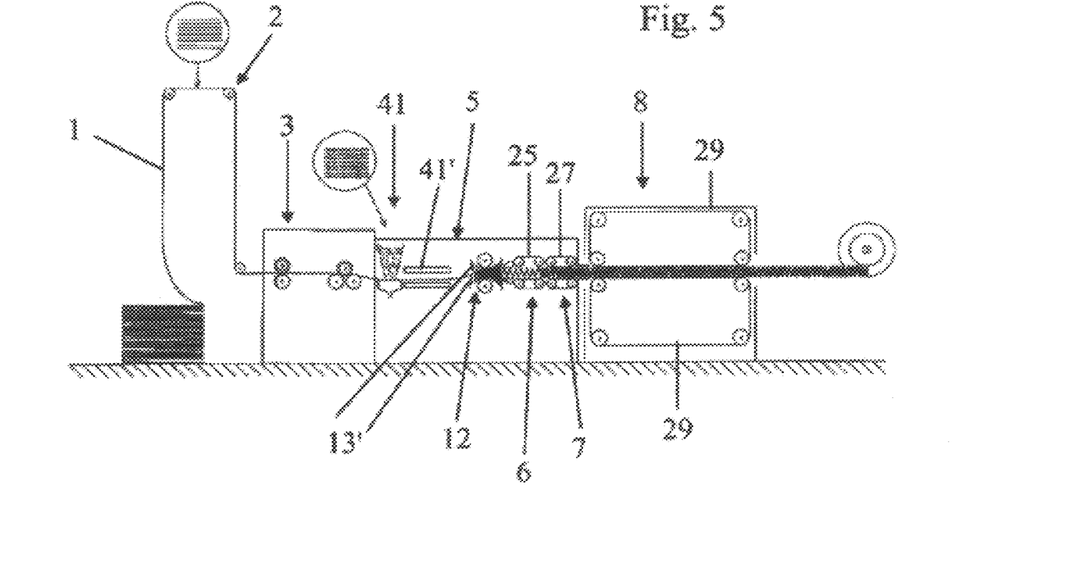
Figure 6:
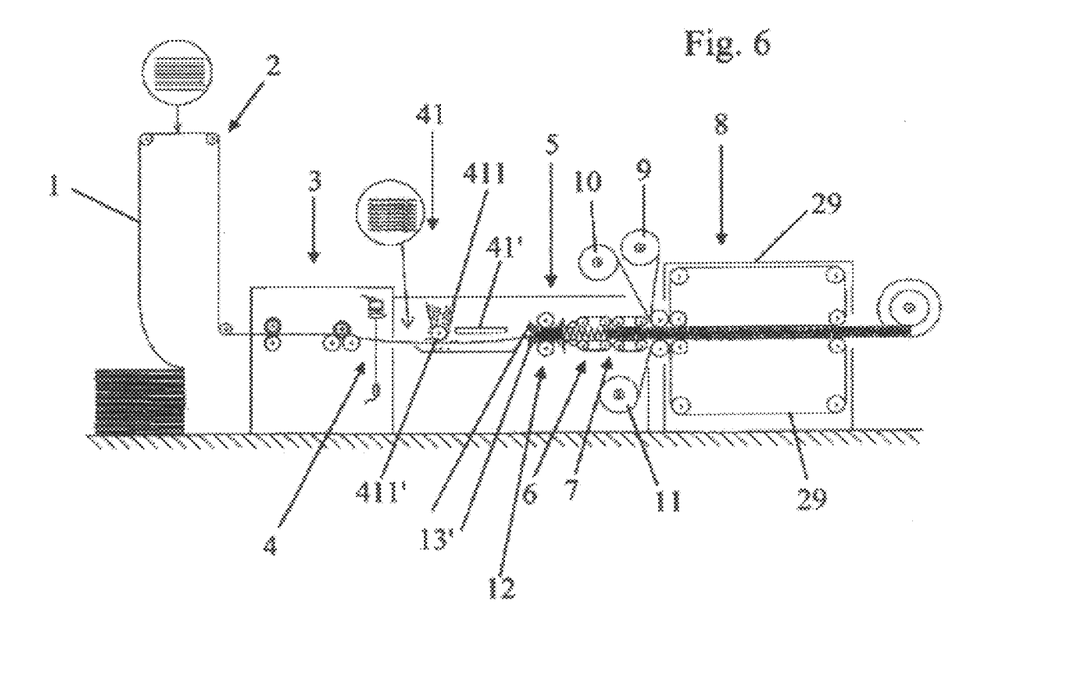
Figure 7:
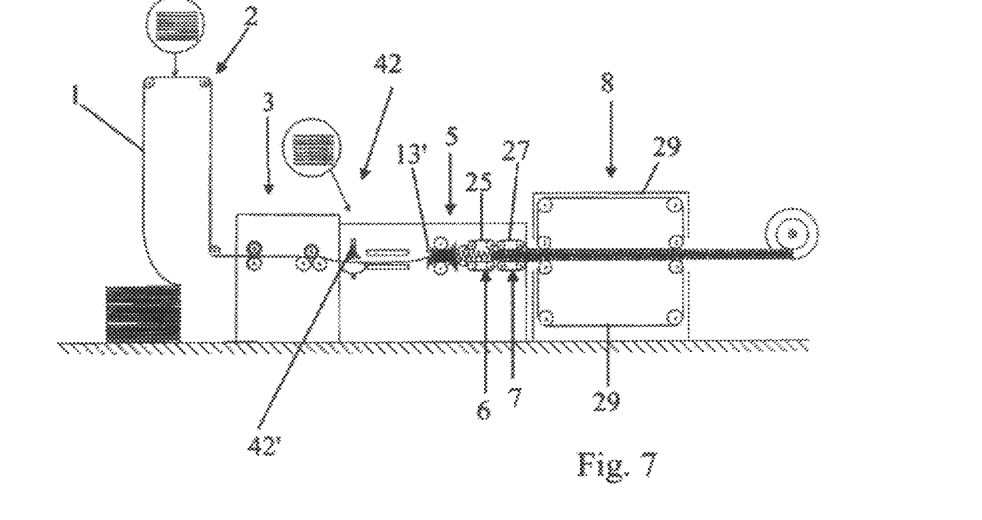

FIGS. 1 and 2 of the drawings in the appendix represent a line for the manufacture of three-dimensional nonwovens, in which one or more two-component tow bales 1 of type T 254 from the company TREVIRA, comprising a portion of thermoplastic fibers or fixation material, are placed on a creel 2. This creel 2 is intended to spread the tow fibers originating from these bales over the total useful width of the manufacturing line before their entry into a defibering area 3, in which the filaments are separated, i.e., they are detached from each other, in such a way as to obtain a very voluminous web with high covering capability, called entering web below.

This defibering area 3 consists of a group of drawing cylinders 3' placed downstream and presenting a speed that is greater than that of a pair of retention cylinders 3" placed upstream. One of the two retention cylinders 3" is provided with a helicoidal groove, so that only a part of the filaments of the entering web is clamped and thus drawn, while the other part is slack. A slight displacement of the filaments with respect to each other is thus created, which has the effect of separating them. Defibering devices of this type are used on the tow fiber converting machines called Converter TT12 from the company N. SCHLUMBERGER. To control the regular feed of the manufacturing line, a visual control device 4 for controlling the regularity of the spread of the web is provided.

According to the invention, the process for manufacturing a three-dimensional nonwoven consists in producing, by means of a folding element 5 that works in cooperation with an extraction device 6, which consists of a pair of two muffs 25 whose linear displacement speed is slightly greater than the outlet speed of the folding element 5, from the entering web, which comprises a portion of thermoplastic fibers or fixation material, and is obtained at the outlet of the defibering area 3, a prior fixation of the fold of the entering web, in the form of peaks and valleys, which fold is obtained by blades that extend radially on heads of the folding element 5, where this prior fixation is produced by maintaining the temperature of the folding element 5 itself or by heating the entering web.

The folding element 5, which forms the means to implement this process, and which is represented in FIGS. 1-9, 12, 13, 15 and 16, comprises at least two heads 12, drums or axles equipped with fixed radial blades 13 or orientable radial blades 13' which intersect, and an extraction device 6 which consists of a pair of two muffs 25 whose linear displacement speed is slightly greater than the outlet speed of the folding element 5. This folding element 5 serves to mark folds on the entering web, and create peaks and valleys.

For the implementation of the process, it is naturally necessary for the entering web to comprise a portion of thermoplastic fibers or a thermoplastic fixation material, having preferably a low softening point, to allow the fixation of the folds.

For this purpose, according to a characteristic of the invention, the entering web consists totally or partially of synthetic fibers, for example, in a mixture with other natural, mineral or artificial fibers. This entering web can be in the form of a web, a coated spread web originating from a spreader coater, or drawn successively. It can also consist of a band of paper or cardboard of low stiffness, or of BCF (Bulky Continuous Filament) threads or fiber yarns. It is preferred for the web to be constructed in the form of a web of juxtaposed continuous filaments that are parallel to each other. This web can also originate from a spinning extrusion installation of the spun bond or melt blown type, or of a tow fiber bale.

Although most synthetic fibers are thermoplastic, their softening temperature is often very high, so that a high expenditure for heating energy is required, which increases the cost of the manufacturing process accordingly. It is therefore desirable to use "low melt" type fixation materials, with a low softening point, to make the process more economic.

According to another characteristic of the invention, the entering web could advantageously consist of a mixture of polyester fibers or filaments, preferably of the polyethylene terephthalate (PET) type, which are intended to form the structure of the three-dimensional nonwoven, and of a copolyester, preferably of the copolyethylene terephthalate (COPET) type, forming a fixation material. Using such components that comprises the same type of monomer simplifies the recycling, without requiring the separation between the fixation material and the constitutive material of the structure. For example, a two-component tow fiber of continuous filaments, with the commercial name "T 254," from the company TREVIRA, with the a polyester core (PET) and polyester coating (COPET), has been used successfully as an entering web for the implementation of the process according to the present invention. Other materials, such as notably olefins (polypropylene, polyethylene . . . ), are obviously also usable.

Although the entering web is a web of discontinuous fiber, or equivalent to a web, the structural fibers are mixed intimately, i.e., fiber by fiber, with fixation fibers, upstream of the card according to a predetermined proportion. Technically, such an arrangement is easy to implement, and the determination of an optimal proportion is also within the scope of the person skilled in the art.

According to another embodiment variant of the invention, in the case of the use of an entering web that comprises no fixation material, the process consists in carrying out, at a deposition station 40, 41, 42 upstream of the folding element 5, the deposition of fixation material on the entering web which is intended to form the structure of the three-dimensional nonwoven. Such a deposition of a fixation material is necessary, for example, if an entering web consisting of a standard tow fiber made of polyester or polyamide is used.

The deposition of a fixation material can be carried out by coating with a sizing tarp 40, by powdering through the intermediary of a powdering module 41, or by atomization by means of an atomization module 42, as shown in FIGS. 4, 5, and 6 and 7, respectively.

In the case of deposition by coating or by atomization, the fixation material is first heated, so that it is liquid and can be applied, either by a coating cylinder of the sizing tarp 40 or under pressure through the atomization nozzles 42' of the atomization module 42, on the moving web. Such a process is advantageously implemented by the arrangement of the tarp 40 and module 42 upstream of the folding element 5, for example, between said folding element 5 and the visual control device 4 for controlling the regularity of the spreading of the web.

The process of deposition by powdering by means of a module 41 consists in depositing by gravity a powder of low melt material on the entering web of continuous filaments constituting the structure, where the web moves beneath a hopper 411 of the powdering module 41, and said hopper is equipped with a structured cylinder 411' (FIG. 6) or an unstructured cylinder (FIG. 5), and the web then passes through a heating area 41', in which the powder of low melt material reaches a temperature that is sufficient for it to liquefy and coat partially the structural filaments, while the web cools slightly as it advances toward the folding element 5, to reach a temperature at which the low melt component is at the point of solidifying. The blades of the folding element then form folds that are fixed by the fixation material in the solidification phase (cold forming).

According to a first embodiment of the invention, the prior fixation of the fold is carried out by maintaining the temperature of the folding element 5, particularly of its blades, in such a way that the thermoplastic components or the fixation material of the web reach at least their softening temperature, and the fixation of the folds at the level of the ends of the blades is ensured (hot forming). This solution presents the advantage of not fixing the peaks and valleys of the three-dimensional nonwoven, while the flanks remain unchanged and thus completely preserve their flexibility.

According to an embodiment variant of the invention, the prior fixation of the web of the web can also be achieved by heating the entering web, in such a way as to bring the thermoplastic components or the fixation material at least to their softening temperature, while the folding element 5 remains cold. Such a prior fixation of the folds is also carried out essentially at the level of the peaks and valleys. This embodiment presents the advantage of consuming less energy, since the textile material, and not the folding element 5, is heated.

The two proposed variants for the prior fixation of the folds of the entering web facilitate the extraction of the folded material from the folding element 5. Indeed, since the folds are marked by the blades 13, the folded material possesses, immediately at the outlet of the folding element 5, a sufficiently compact structure which prevents the fibers from catching, and rising in the folding element 5. Thus, it is possible to ensure a high-speed industrial operation of the folding element 5.

It is particularly interesting to observe that, after cutting a three-dimensional nonwoven so produced, it is easy to extract and separate the fibers that constitute the structural material, for example, by threading with a carding willow, so that they become immediately reusable as card feed.

The folding element 5 comprises two heads 12, on which the fixed radial blades 13 or orientable radial blades 13' are arranged, where the distance that separates the heads is adjustable and thus determines the height of the fold to be obtained. Moreover, the heads 12 are interchangeable and are equipped with interchangeable blades of different heights. Thus, it is possible to adapt the heads 12 of the folding element 5 as needed to the production of three-dimensional nonwovens having different heights.

Figure 15:
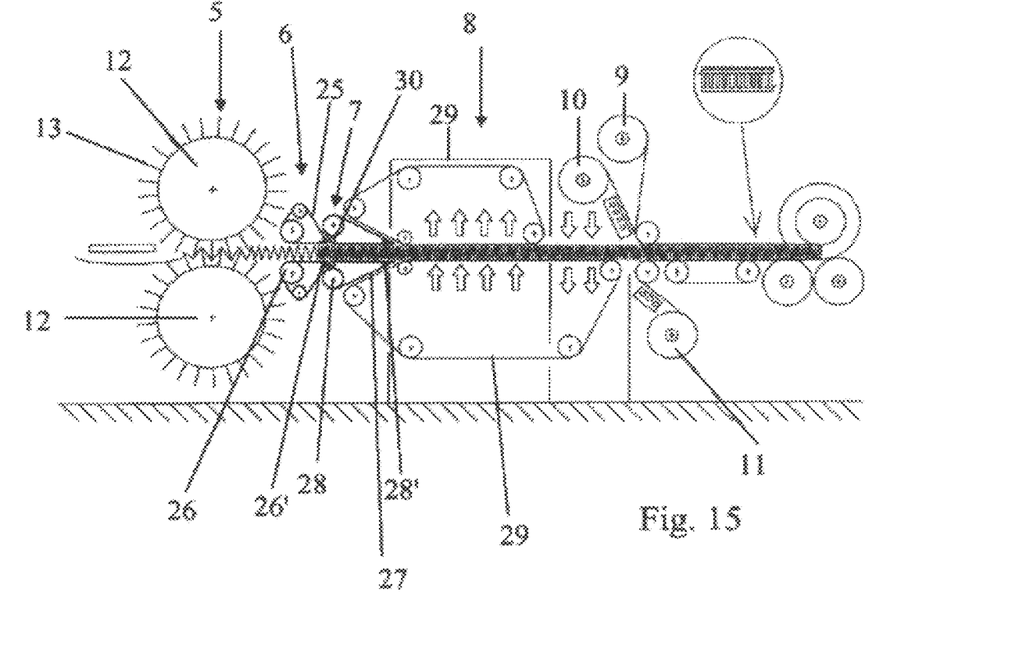
FIGS. 15 and 16 are views similar to those of FIGS. 1 and 2 of the manufacturing lines that use other embodiment variants of the machine according to the invention.

According to a first embodiment of the invention, which is represented in FIGS. 1, 2 and 15 in the drawing of the appendix, the heads 12 of the folding element 5 are preferably drums constructed from hollow cylinders, on which the fixed radial blades 13 are arranged. These drums present naturally large bending movements, which allows their use for large work widths. Thus, it is possible to produce manufacturing lines that have a range of more than two meters, up to five meters.

The radial blades 13 are mounted on the drums that constitute the heads 12 of the folding element 5, by extending each in perfect alignment with the corresponding radius of the drum or at an inclination with respect to said radius.

Figure 16:
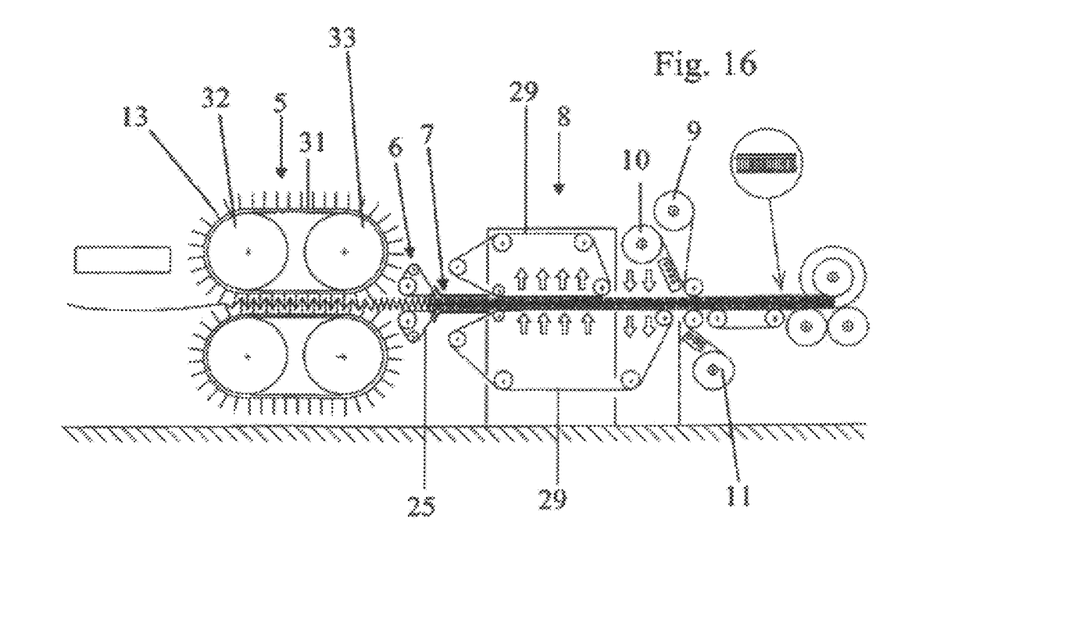

FIG. 16 of the drawings in the appendix represents an embodiment variant of the folding element 5 with fixed radial blades. In this embodiment, the blades 13 of each head 12 are arranged fixedly on the endless, but flexible, transport elements 31, such as, chains, articulated links; belts or muffs, and the transport elements work in cooperation, like belts with pinions, with two drums 32 and 33, of which at least one is motor-driven. This embodiment variant of the folding element 5 is particularly appropriate for three-dimensional nonwovens of small thickness.

The rate of production of a folding element 5 with fixed elements is not determined by the working speed of the blades expressed in terms of numbers of blades per minute, because, due to the fact that the blades are fixed with respect to the drum or with respect to the transport elements 31, they do not come in contact with other elements capable of affecting their movement, and thus limiting the working speed of the folding element 5. Consequently the capacity of a manufacturing line so equipped is increased considerably and makes the process according to the invention particularly competitive compared to the conventional processes for manufacturing three-dimensional nonwovens.

Figures 9, 10, 11:
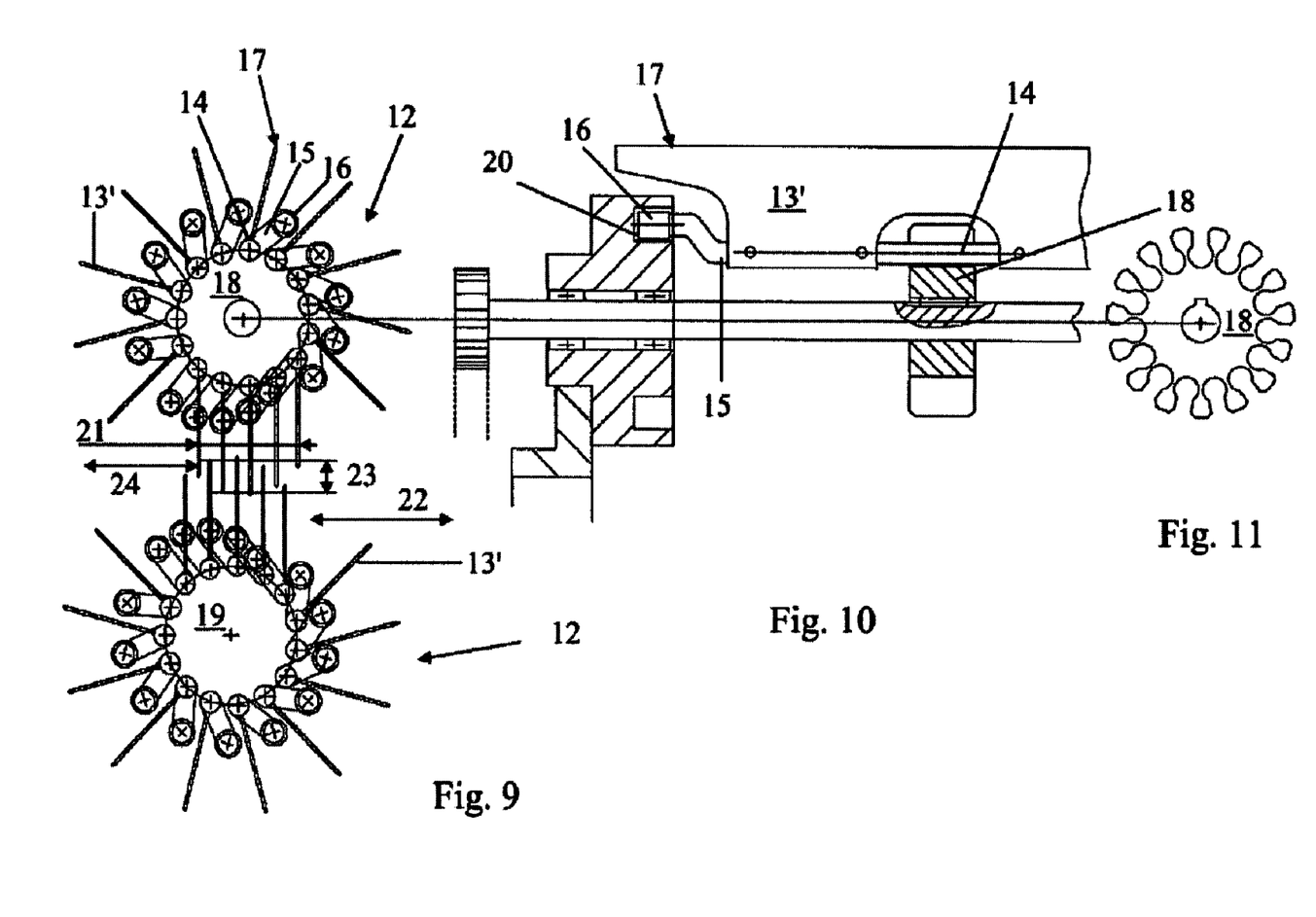
FIGS. 9 and 11 are partial cross-sectional views, at a larger scale, representing details of the orientable blades of the folding element.

FIGS. 9-11 of the drawings in the appendix represent manufacturing lines in which the radial blades 13' of the folding element 5 are orientable, i.e., the blades 13', which are mounted on constitutive wheels 18, 19 of the heads 12, do not preserve the same orientation, depending on the position in which they are. One distinguishes successively the following areas: folding preparation area 24, effective folding area 21, transfer area 22, and the return path of the blades.

According to a characteristic of the invention, in such a case, the blades 13' are in the form of plates or bars of very large length and of small width, where the length of the blades 13' is slightly greater than the width of the band of web to be folded. In addition, each blade 13' presents, at one of its ends, in the direction of its width, an articulation 14 and a crank arm 15, which is equipped with a guidance roller 16 that works in cooperation with a cam race 20, and, at its opposite end 17, a surface that is intended to come in contact with the web to be folded. The blades 13' are arranged on the wheels 18 and 19 in such a way that each one of their ends 17 extends toward the exterior of each one of the wheels 18 and 19. The blades 13' are crosslinked at 14, and, during operation, the articulation point of each blade 13' describes a circular trajectory, which ensures that, at the end of a cycle, each blade 13' returns to the initial position that it had at the beginning of the cycle. Thus, the inclination of the blade 13' is conferred by the profile of the cam race 20, which determines the angular position of the guidance roller 16 with respect to the articulation point 14 of the blade 13'.

According to a characteristic of the invention, the profile of the cam race 20 is determined in such a way as to confer to the blades 13', by cooperation with the guidance roller 16 of each blade 13', an inclination of said blades that is almost perpendicular to the inlet trajectory of the web to be folded, in an effective folding area 21. In said folding area 21, the folded web is held and conveyed up to a transfer area 22. The blades 13' of the wheel 18 intersect with the blades 13' of the wheel 19, in such a way that, in this effective folding area 21, the distance separating the ends 17 from the blades 13' of the wheel 18 from the ends 17 of the blades 13' of the wheel 19 remains as constant as possible, while each blade 13' of the wheel 18 is also arranged nearly in the middle of the gap between each blade 13' of the wheel 19 and said blades 13' of the wheels 18 and 19 interpenetrate.

Thus, in the effective area of folding 21, each blade 13' of the wheel 18 is arranged in the middle or practically in the middle of the gap between two successive blades 13' of the wheel 19, and, in order to modify the height of the fold formed in the web to be folded, it will be sufficient to modify the value 23 of the interpenetration (FIG. 9) between the blades 13' of the wheels 18 and 19. The value 23 of the interpenetration of the blades 13' corresponds to the distance that is measured practically perpendicularly to the blades 13' and separates the ends 17 of the blades 13' of the wheels 18 and 19. The value 23 of the interpenetration of the blades 13' will determine—in combination with the pitch of the blades 13', i.e., taking into consideration approximately the distance that separates the articulation points 14 of two consecutive blades 13'—the length of the fold that will be formed in the web to be folded.

The effective folding area 21 is preceded by a folding preparation area 24, in which the inclination of the blades 13' of the wheels 18 and 19 is modified gradually in such a way that the distance separating the ends 17 of the blades 13' of the wheel 18 from those of the blades 13' of the wheel 19 remains as constant as possible. Toward the end of the folding preparation area 24, the inclination of the blades 13' of each wheel 18 and 19 is modified in such a way that they are arranged parallel to each other (FIG. 9).

This change in inclination is obtained in the same way as described above by the modification of the angular position of the bearing 16 with respect to the articulation point 14 of the blades 13'. In this folding preparation area 24, the ends 17 of the blades 13' of the wheel 18 are also brought gradually closer to the ends 17 of the blades 13' of the wheel 19. Thus, in the folding preparation area 24, the blades 13' of the wheels 18 and 19 enter at an inclination and they are arranged gradually almost in parallel to each other, and their ends 17 come gradually closer to each other, since they interpenetrate until they reach the interpenetration value 23 determined by the geometry of the effective folding area 21. It follows that the web to be folded is folded gradually until it reaches the fold length determined by the geometry of the effective folding area 21.

During this operation of forming folds, the web to be folded is displaced by the end 17 of the blades 13'. The geometry of the folding preparation area 24 is such that one seeks to prevent the relative displacement of the web to be folded with respect to the end 17. However, in the case where such a displacement occurs nevertheless, it occurs while exerting a minimum stress on the web to be folded so as not to damage it. To this effect, the blades 13' present, at their end 17, a surface that is intended to come in contact with the web to be folded. This surface can be formed from a material that ensures a very low coefficient of friction between said material and the web to be folded. In a variant, said surface can be in the form of a freely rotating cylinder having a small moment of inertia.

The geometry and particularly the length of the folding preparation area 24 are determined as a function of the resistance of the web to be folded. Thus, in the case of webs to be folded that present a low resistance, the folding operation should be carried out very gradually to prevent damaging said web to be folded, and it is preferred to use a folding preparation area 24 of great length, to reduce as much as possible the stresses undergone by the web to be folded.

The effective folding area 21 is extended by a transfer area 22, in which the blades 13' of the wheels 18 and 19 are separated gradually from the folded web. The cam race 20 of the guidance rollers 16, which ensures the pivoting of the blades 13', is constructed in such a way that the blades 13' of the wheels 18 and 19 remain almost parallel to each other, as long as they are in contact with the folded web. The blades 13' slide along folds formed in the folded web until they are completely extracted from the folded web.

During the movement of extraction of the folded web, it is necessary to ensure that the blades 13' exert as little stress as possible on the web to prevent damaging it.

After their complete extraction from the folded web, the blades 13' are pivoted, in a gradual way, from the nearly parallel position in which they were when they were in contact with the folded web at an angular position, in such a way that they can be moved easily along the return path toward the folding preparation area 24. This angular position is preferably such that the blades 13' are perpendicular to the trajectory of their articulation points 14. However, other angular positions are also possible.

Figure 12:
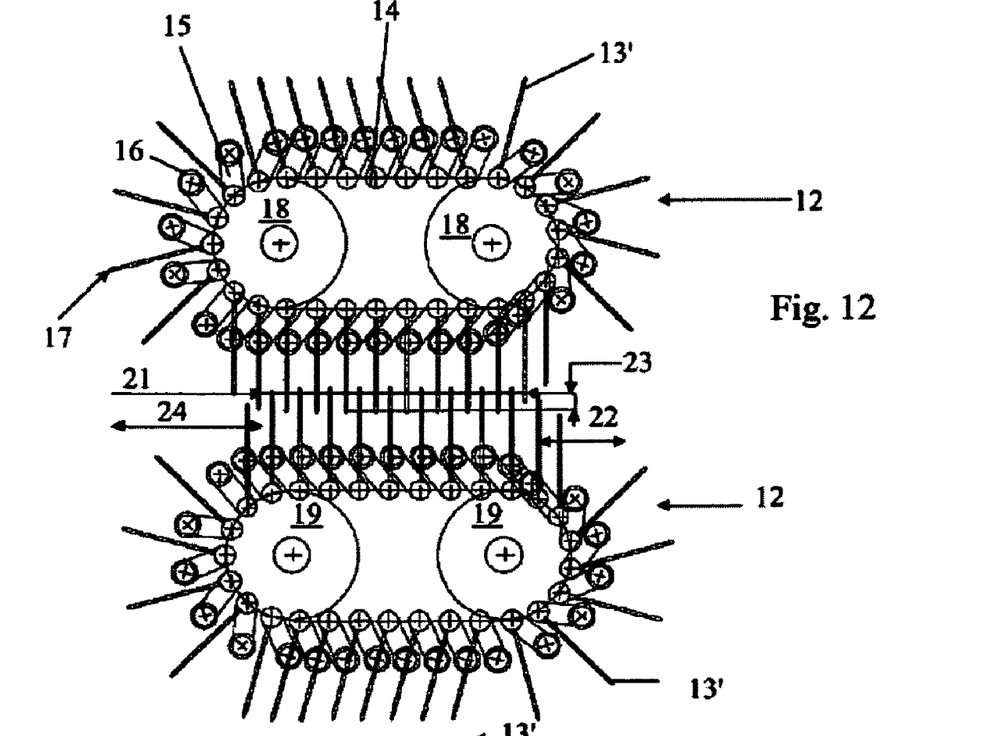
FIG. 12 is a lateral elevation view at a larger scale representing a folding element with orientable blades with the Gills with chains type.
Figure 13:
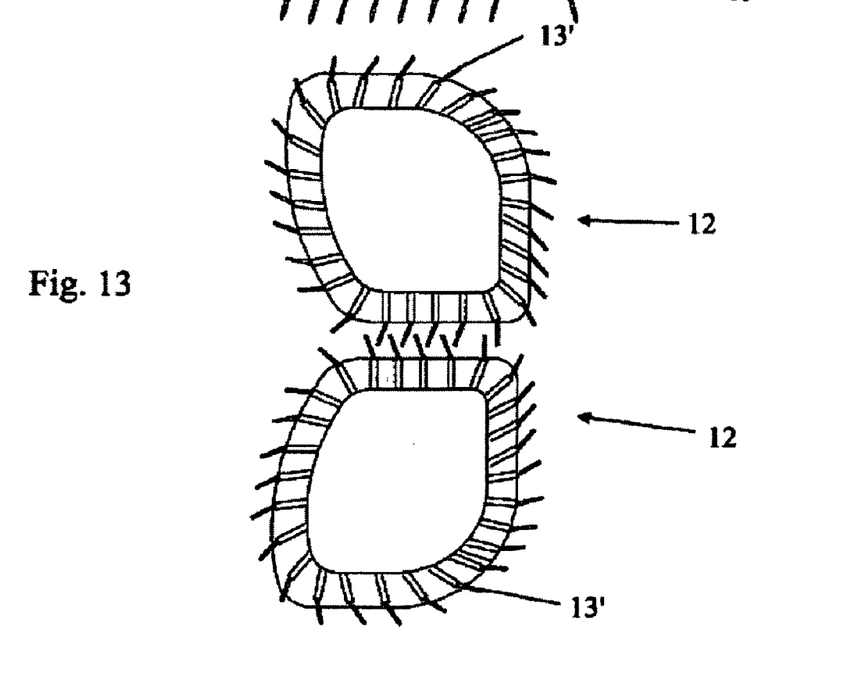
FIG. 13 is a view similar to that of FIG. 12 of a folding element with orientable blades of the Gills Soleil type.

FIGS. 12 and 13 of the drawings in the appendix represent other embodiment variants of the folding element with orientable blades 13', namely, those of the type known under the name gills with chains and Gills Soleil. Other devices of similar technology can also be used, namely those of the type known under the name of Intersecting with Screw or Push Bars.

In the case of the use of a technology of the gills with chains type (FIG. 12), the heads 12 are in the form of gills with tracked chains, and the articulation points 14 of the blades 13' are moved by means of chain links, which are set into motion by pinions with chain. The special feature of such a technology, in contrast to the one described in reference to devices with wheels, is that it allows the articulations of the blades 13' to follow trajectories other than simple circular trajectories. Thus, it is possible, for example, to constrain the articulations 14 to follow a rectilinear trajectory of great length in the folding area 21, in such a way as to increase the holding duration of the folds of the entering web.

In the embodiment according to FIG. 13, the heads 12 are in the form of Gills Soleil heads equipped with wheels (not shown), which set the blades 13' in rotation, where said blades 13' are guided in radial displacement through the intermediary of their longitudinal ends that pass through radial guidance grooves and work in cooperation with a cam race. In this embodiment, the blades 13' are in the form of bars that are free with respect to each other, and can slide in guidance grooves provided inside the driving wheels. The inclination of the grooves is such that the blades 13' of each wheel are arranged parallel to each other in the folding area 21.

In the case of the use of a technology of the Intersectings with Screw type (not represented in the drawings in the appendix), the blades 13' are moved, in the direction of advance of the forming folded web, by drive screws, whose screw pitch determines the separation of the folds. At the end of each screw, the blades are extracted from the screws and expelled by hammers, then slowed for their insertion in the thread of driving screws turning in the opposite direction. At the end of the driving screws that turn in the opposite direction, other hammers drive the blades toward the first screws. The trajectory of the blade is called "square."

If a technology of the Push Bar type (not shown in the drawings in the appendix) is used, the blades 13' are not inserted in the screw threading and moved by these screws, instead they are directly contiguous at the level of their flange, and spaced by their flange. These blades are then pushed toward each other, and they slide along rectilinear guides. At the end of the rectilinear guides, they follow a circular trajectory, which is imparted to them by toothed wheels, whose teeth are inserted between the flanges of two successive bars.

Figure 14:
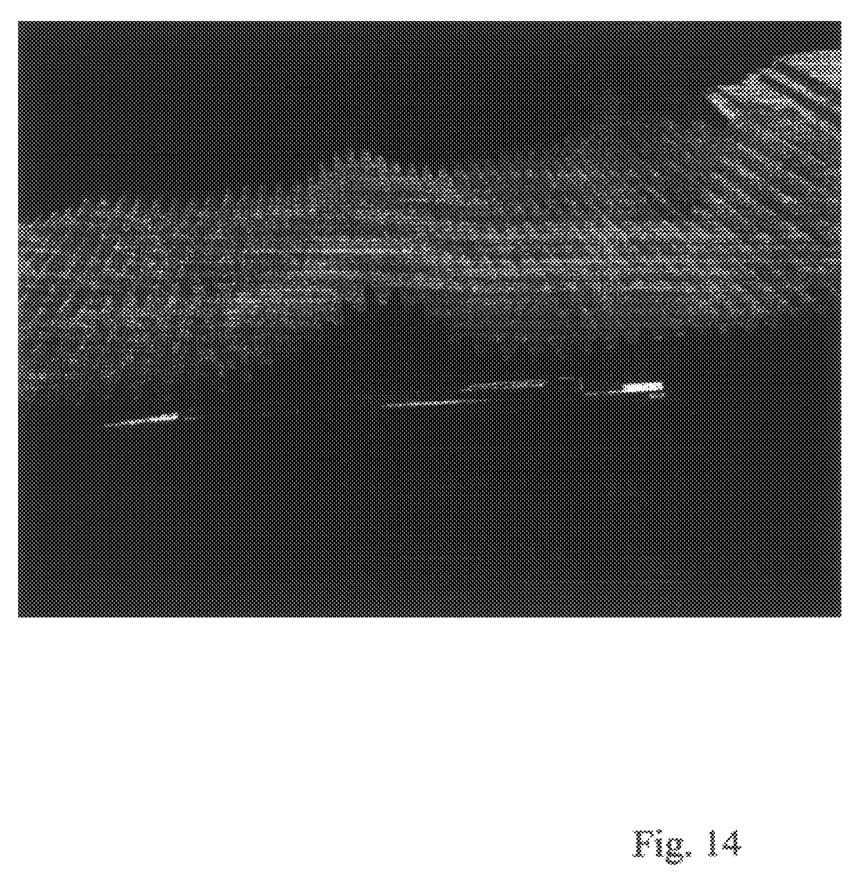
FIG. 14 is a photographic representation of a three-dimensional nonwoven.

FIG. 14 of the drawings in the appendix is a photographic representation of a product obtained at the outlet of the folding element 5.

Figure 8:
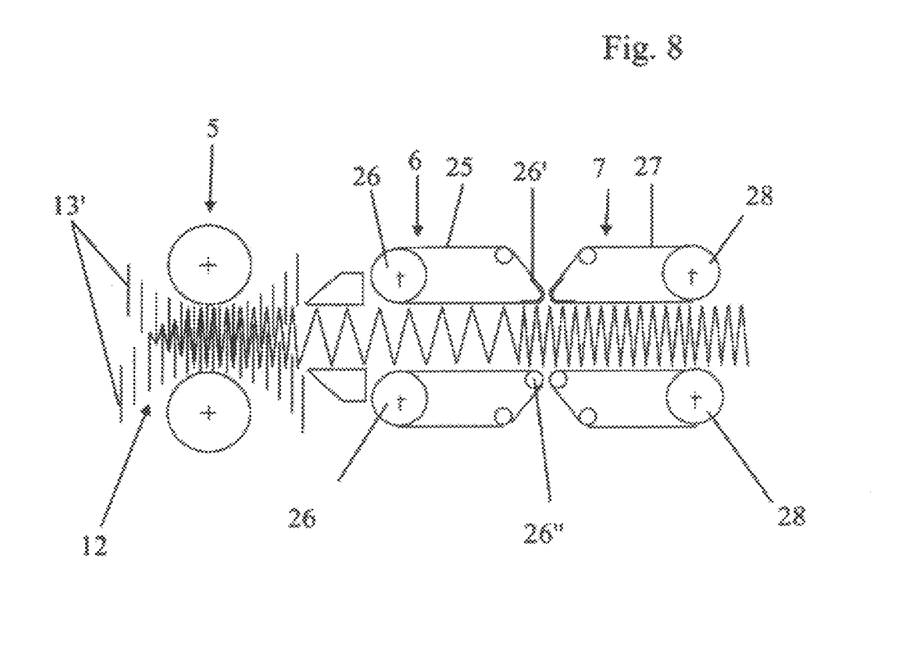
FIG. 8 is a lateral elevation view at a larger scale of the compression and extraction devices.

The entering web, which has been folded, and whose peaks and valleys are marked sufficiently, is extracted from the folding element 5, regardless of what the configuration of the latter is, namely with fixed blades 13 or orientable blades 13', by an extraction device 6 (FIGS. 1 and 2). The latter consists preferably of a pair of two superposed muffs 25, which are separated from each other by a distance which is in a direct relation with the interpenetration value 23 and whose linear displacement speed is slightly greater than the outlet speed of the folding element. These muffs 25 are stretched generally between two cylinders 26 (FIGS. 1-7). However, according to an embodiment variant of the invention, which is represented in FIG. 8 of the drawings in the appendix, it is also possible to replace the downstream cylinders 26 of the muffs 25 by fixed spouts 26' or by spouts with rollers 26".

The extraction device 6 is extended by a compression device 7 (FIGS. 1-8), which consists of a set of two muffs 27 which are stretched between two superposed cylinders 28 and whose linear displacement speed is less than that of the extraction device 6, to ensure the compression of the material. The value of the compression, which can be expressed as the number of folds per unit of length, is a function of the ratio of the speed between the muff 25 of the extraction device 6 and the muff 27 of the compression device 7.

According to an embodiment variant of the invention, which is represented in FIG. 15 of the drawings in the appendix, the downstream cylinders 28 are replaced by fixed spouts 28'. These downstream cylinders 28 can also be replaced by spouts with rollers (not shown). In addition, in this embodiment, the compression device comprises, for each one of its muffs, a deflection cylinder 30 arranged between the upstream cylinder 28 and the fixed spout 28' or spout with rollers. These deflection cylinders 30 of the compression devices 7 are placed preferably immediately downstream of the fixed spouts 26' or spouts with rollers 26" of the extraction device 6.

The upstream cylinders 28 of the compression device 7 themselves are arranged upstream of the spouts 26' or 26" of the extraction device 6, in such a way that the trajectory of each muff 27 of the compression device 7 is parallel to the trajectory of each muff 25 of the extraction device 6, at least in the area located between the upstream cylinder 28 and the spout 26' or 26" of the extraction device 6. This special feature of the trajectory of the muffs makes it possible to reduce the risk of winding fibers or filaments around the muffs of the extraction and compression devices. Indeed, because the upstream cylinder 28 extends in front of the spout 26' or 26" of the extraction device 6, the fibers or filaments, which exit from the latter at a speed above their driving speed in the compression device 7, which would tend to escape through the intermediate area between the extraction device 6 and the compression device 7 and become packed, come in contact with the corresponding muff part 27 of the compression device 7, and are gradually returned into said compression device 7.

FIG. 16 of the drawings in the appendix represents an embodiment variant of the compression device 7, in which the latter consists of a set of an upper plate and a lower plate, which serve to compress the folded material and lead it to a downstream processing station.

In such a case, and in the presence of a compression device 7 according to FIG. 16, the compression value is determined by the speed of the belts of the fixation furnace itself. Depending on the surface state of the plates, and as a function of their mutual position, the folded material can be slowed more or less so as to be compressed more or less. To this effect, the upper and lower plates can be parallel, or convergent, or even curved.

The folded material obtained at the outlet of the compression device 7 presents a relatively open structure with a small number of folds per unit of length, and it can be used optionally as is at the outlet of said compression device. However, for the obtention of more compact three-dimensional nonwovens, it is necessary to consolidate the folded material originating from the compression device 7.

To this effect, according to another characteristic of the invention and as shown in FIGS. 1-7, 15 and 16, the process comprises, in addition, a step which consists in moving the folded material in a hot air furnace 8, of the type with traversing air (FIGS. 15 and 16) or of the type of a press with belt (FIGS. 1-7).

The furnaces 8 used in the manufacturing line according to the invention consist advantageously of two belts 29 that are driven at a linear displacement speed that is very similar to that of the muffs 27 of the compression device 7, so that the three-dimensional nonwoven can be extracted from the compression area without risk of the fibers or filaments catching. According to a characteristic of the invention, when a furnace with traversing hot air is used, the perforated belts 29 present sufficient permeability to allow hot air to pass through (FIGS. 15 and 16).

In another type of furnace 8, the belts 29 can, according to another embodiment of the invention, be impermeable to air, like a press with belt, where the heating is then carried out by means of electrical resistances placed as close as possible to the belt (FIGS. 1-7). Finally, it is also possible to add heat energy to the furnace 8 by other means, namely by thermal convection, by infrared radiation, or by high-frequency electronic agitation, for example.

In addition, it is possible to counter glue a coating material on the folded structure, such as a decorative fabric 9, on the visible face, or upper face, of the three-dimensional nonwoven, through the intermediary of a thermoadhesive film 10, where the nonvisible face, or lower face, is provided with a light thermoadhesive calendared nonwoven 11. Naturally, it is also possible to provide the two faces of the three-dimensional nonwoven with an identical coating, or to coat only one face.

When the furnace 8 used is of the type with traversing hot air (FIGS. 15 and 16), and if a coating material, such as a fabric with low permeability to air, is to be counter glued on the folded structure, the counter gluing can be carried out at the outlet of the furnace 8.

After the steps of the definitive fixation and of the placement of coatings on the upper face and/or lower face, the three-dimensional nonwoven product obtained can be packaged in the form of plates or rolls.

Another object of the invention is a three-dimensional nonwoven obtained by the implementation of the process according to the invention by means of a manufacturing line according to the invention.

This product is characterized in that it consists of a web of fibers comprising a portion of thermoplastic synthetics or a fixation material, and in that it presents essentially vertical folds, that are formed by the prior fixation of the peaks and valleys of the web.

According to a characteristic of the invention, this product can be provided, at least on one face, with a coating in the form of a decorative fabric 9 glued by means of a thermoadhesive film 10 to the folded structure, or in the form of a light thermoadhesive calendared nonwoven 11, or other types of materials counter glued on the upper face and/or lower face. naturally, these coatings can also be combined.

The product according to the invention can be packaged in the form of plates or rolls.

Thanks to the invention, it is possible to produce, by means of a manufacturing line that are easy to design and manufacture, and thus at a low cost price, products that present a perfectly vertical structure, a remarkably high resilience, and are durable in comparison to currently commercially available equivalent products.

The density of these products can be regulated easily by changing the speed of the compression device, and their manufacturing cost is low. In addition, these products are easy to recycle.

Naturally, the invention is not limited to the embodiments that have been described and represented in the drawings in the appendix. Modifications remain possible, notably from the point of view of the constitution of the different elements, without leaving the scope of protection of the invention.

The invention claimed is:

1. A process for the manufacture of a three-dimensional nonwoven material comprising the steps of:
   providing a nonwoven web, the nonwoven web comprising thermoplastic fibers or fixation material,
   forming peaks and valleys in the nonwoven web by introducing the nonwoven web into a folding element, the folding element comprising a plurality of blades that extend radially from a plurality fo heads, the folding element operating at a first linear displacement speed, fixing the peaks and valleys in the nonwoven web to form a three-dimensional nonwoven material, by heating the folding element itself or by heating the nonwoven web, while the nonwoven web is in the folding element, extracting the nonwoven material from the folding element with an extraction device the extraction device comprising a pair of conveyors, the conveyors operating at a second linear displacement speed which is greater than the first linear displacement speed.

2. Process according to claim 1, wherein the nonwoven web comprises synthetic fibers.

3. Process according to claim 1, wherein the nonwoven web is selected from the group consisting of a nonwoven web, a coated nonwoven web, and a nonwoven web of juxtaposed continuous filaments that are parallel to each other.

4. Process according to claim 1, wherein the nonwoven web comprises a web selected from the group consisting of paper, cardboard, a web comprising BCF (Bulky Continuous Filament) threads and a web comprising fiber yarns.

5. Process according to claim 1, wherein the step of providing the nonwoven web comprises a step selected from the group consisting of forming the nonwoven web by spunbonding, forming the nonwoven web by melt blowing and forming the nonwoven web from a bail of tow fiber.

6. Process according to claim 1, wherein the nonwoven web comprises of a mixture of at least one of polyester fibers or filaments, which are intended to form a structure of the three-dimensional nonwoven material, and of a copolyester forming a fixation material.

7. Process according to claim 1, wherein the fixation of the peaks and valleys is carried out by maintaining a temperature of a plurality of the blades of the folding element in such a way that the thermoplastic fibers or the fixation material of the web reach at least their softening temperature, and the fixation of the peaks and valleys at the level of the ends of the blades is ensured.

8. Process according to claim 1, wherein the fixation of the peaks and valleys is carried out by heating the nonwoven web, in such a way as to heat the thermoplastic fibers or the fixation material at least to their softening temperature, the folding element remaining cold.

9. Process according to claim 1, wherein fixation material is deposited on the nonwoven web at a deposition station upstream of the folding element.

10. Process according to claim 9, wherein the deposition of a fixation material is carried out by a step selected from the group consisting of coating with a sizing tarp application of powder, and applying fixation material under pressure through atomization nozzles.

11. Process according to claim 10, wherein the deposition of fixation material comprises:

depositing by gravity a powder of a low melt material on the nonwoven web by moving the nonwoven web below a hopper, said hopper optionally equipped with a structured cylinder, and subsequently passing the nonwoven web through a heating area where the powder of a low melt material reaches a sufficient temperature for the powder to liquefy and partially coat the nonwoven web, and cooling the nonwoven web as it advances toward the folding element, to reach a temperature at which the low melt component is at a solidifying point.

12. Process according to claim 1, further comprising the step of moving the folded-three-dimensional nonwoven material into a hot-air oven.

\* \* \* \* \*